(12) United States Patent
Noack et al.

(10) Patent No.: US 10,093,011 B2
(45) Date of Patent: Oct. 9, 2018

(54) OSCILLATINGLY DRIVEN MACHINE TOOL

(71) Applicant: C. & E. Fein GmbH, Schwaebisch Gmuend-Bargau (DE)

(72) Inventors: Steffen Noack, Halsbruecke (DE); Tobias Voigt, Chemnitz (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 408 days.

(21) Appl. No.: 15/153,080

(22) Filed: May 12, 2016

(65) Prior Publication Data

US 2016/0256993 A1    Sep. 8, 2016

Related U.S. Application Data

(63) Continuation of application No. PCT/EP2014/074366, filed on Nov. 12, 2014.

(30) Foreign Application Priority Data

Nov. 13, 2013  (DE) .......................... 10 2013 112 455
Feb. 19, 2014  (DE) .......................... 10 2014 102 131

(51) Int. Cl.
*B23D 47/12*    (2006.01)
*B23Q 5/06*     (2006.01)
(Continued)

(52) U.S. Cl.
CPC .............. *B25F 5/005* (2013.01); *B23D 47/12* (2013.01); *B23Q 5/027* (2013.01); *B23Q 5/06* (2013.01); *B24B 23/04* (2013.01); *B24B 23/043* (2013.01); *B24B 47/12* (2013.01); *B24B 47/14* (2013.01); *B24B 47/16* (2013.01); *B26D 5/12* (2013.01); *F15B 15/12* (2013.01)

(58) Field of Classification Search
CPC .. B23D 47/12; B23Q 5/06; B23Q 5/02; B24B 23/04; B24B 47/12; B24B 47/14
USPC ................................ 173/110; 451/356, 357
See application file for complete search history.

(56) References Cited

U.S. PATENT DOCUMENTS 1,727,276 A  *  9/1929  Diehl .................. E21B 4/02
                                              173/64
3,196,934 A  *  7/1965  Sneen ................. F15B 15/12
                                              160/229.1
(Continued)

FOREIGN PATENT DOCUMENTS

DE    202008013877 U1   1/2009
DE    102008042378 A1   4/2010
(Continued)

*Primary Examiner* — Andrew M Tecco
*Assistant Examiner* — Praachi M Pathak
(74) *Attorney, Agent, or Firm* — Muncy, Geissler, Olds & Lowe, P.C.

(57) ABSTRACT

Disclosed is an oscillatingly driven machine tool including a tool spindle that is mounted pivotably about its longitudinal axis, further including a drive motor that is coupled to a hydraulic generator for generating an oscillating fluid flow which drives a hydraulic motor being configured as a rotor blade motor. The rotor blade motor drives the tool spindle in such a way that the tool spindle rotates oscillatingly about its longitudinal axis. The rotor blade motor includes symmetrically arranged rotor blades that are disposed at regular angular distances with respect to each other.

20 Claims, 3 Drawing Sheets

(51) Int. Cl.
*B23Q 5/02* (2006.01)
*B24B 23/04* (2006.01)
*B24B 47/12* (2006.01)
*B24B 47/14* (2006.01)
*B25F 5/00* (2006.01)
*B24B 47/16* (2006.01)
*B23Q 5/027* (2006.01)
*B26D 5/12* (2006.01)
*F15B 15/12* (2006.01)

(56) References Cited

U.S. PATENT DOCUMENTS

| | | | | |
|---|---|---|---|---|
| 3,552,500 A | * | 1/1971 | Peterson | E21B 4/14 173/105 |
| 3,695,367 A | * | 10/1972 | Catterfeld | B23B 45/04 173/221 |
| 3,908,768 A | * | 9/1975 | Hess | B25B 21/02 173/93 |
| 4,252,121 A | * | 2/1981 | Arnegger | B23D 59/025 606/178 |
| 5,577,564 A | * | 11/1996 | Le | E21B 4/003 175/107 |
| 5,803,187 A | * | 9/1998 | Javins | E21B 4/02 175/296 |
| 5,833,444 A | * | 11/1998 | Harris | E21B 4/02 418/113 |
| 5,919,085 A | * | 7/1999 | Izumisawa | B24B 23/04 451/356 |
| 5,941,325 A | * | 8/1999 | Bækken | F15B 3/00 175/107 |
| 5,996,523 A | * | 12/1999 | Fox | F15B 15/12 114/150 |
| RE36,848 E | * | 9/2000 | Bui | E21B 4/006 173/110 |
| 6,520,271 B1 | * | 2/2003 | Martini | E21B 4/02 175/107 |
| 7,614,227 B2 | * | 11/2009 | Carlson | F16H 61/40 60/487 |
| 7,703,551 B2 | * | 4/2010 | Reagan | E21B 4/02 175/107 |
| 9,421,663 B2 | * | 8/2016 | Thomaschewski | B24B 23/02 |
| 9,657,713 B2 | * | 5/2017 | Shirakawa | F16C 19/181 |
| 9,885,212 B2 | * | 2/2018 | Swinford | E21B 4/14 |
| 2010/0000288 A1 | * | 1/2010 | Barezzani | B25B 27/146 72/453.15 |
| 2010/0139940 A1 | * | 6/2010 | Kobayashi | B25D 9/18 173/162.2 |
| 2011/0036609 A1 | | 2/2011 | Blickle et al. | |
| 2014/0299345 A1 | * | 10/2014 | McRoberts | B24B 23/043 173/162.2 |
| 2014/0367130 A1 | * | 12/2014 | Dougherty | B25B 21/026 173/1 |
| 2016/0256993 A1 | * | 9/2016 | Noack | B25F 5/005 |
| 2016/0305188 A1 | * | 10/2016 | Hay | E21B 47/18 |

FOREIGN PATENT DOCUMENTS

| | | |
|---|---|---|
| DE | 202012101137 U1 | 4/2012 |
| EP | 0248986 A1 | 12/1987 |
| EP | 1428625 A1 | 6/2004 |
| EP | 2283979 A2 | 2/2011 |
| GB | 567549 A | 2/1945 |
| WO | 0203779 A1 | 1/2002 |
| WO | 2010045929 A2 | 4/2010 |
| WO | 2013143538 A1 | 10/2013 |

\* cited by examiner

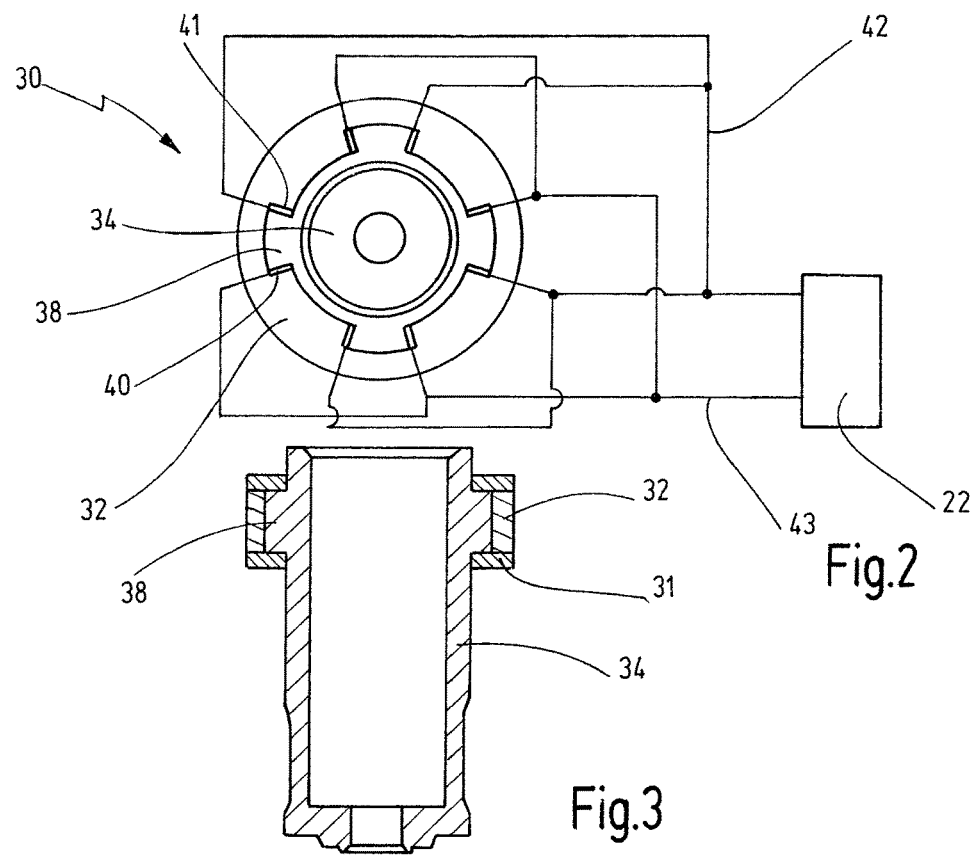
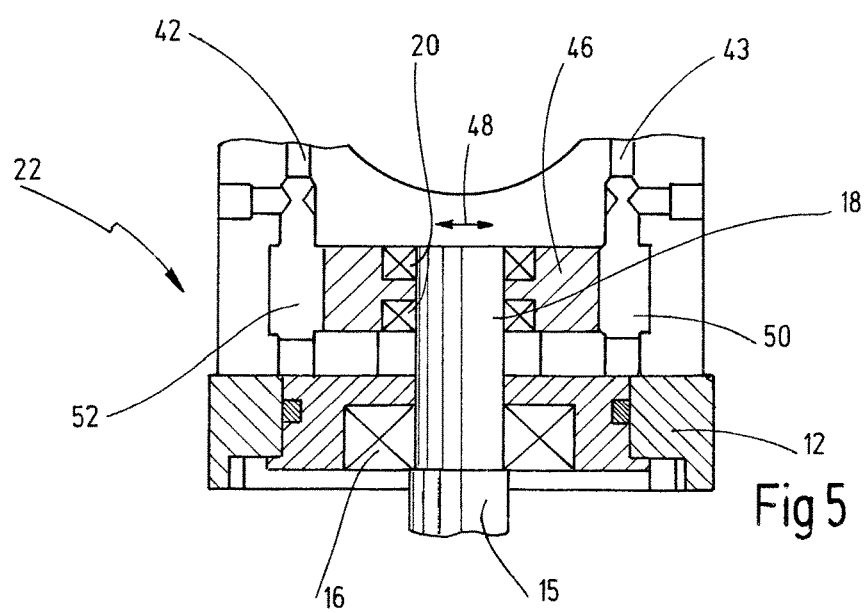

OSCILLATINGLY DRIVEN MACHINE TOOL

FIELD OF THE INVENTION

The invention relates to an oscillatingly driven machine tool comprising a drive motor and a tool spindle mounted pivotably about its longitudinal axis and driven rotatingly oscillatingly about its longitudinal axis.

BACKGROUND OF THE INVENTION

Such oscillatingly driven machine tools are known in various designs. They are driven by means of a mechanical oscillatory gear transforming the rotating drive motion of a drive motor into a rotary oscillatory drive motion of the tool spindle about its longitudinal axis.

According to EP 1 428 625 A1 to this end an eccentric is provided which works together with an eccentric fork for oscillatingly driving the tool spindle. The eccentric is driven rotatingly by an eccentric shaft which is mounted in parallel to the tool spindle.

According to EP 2 283 979 A1 an oscillatingly driven machine tool comprises a drive motor with a motor shaft as well as a tool spindle which is rotatingly oscillatingly driven about its longitudinal axis, wherein a coupling element rotatingly driven by the motor shaft and comprising a closed guide surface circulating about a guide axis, wherein the guide surface is coupled by means of transfer means to at least one entrainer for driving the latter, wherein the at least one entrainer is held movably with respect to the work spindle and engaging within a circumferential region of the work spindle for driving the latter rotatingly oscillatingly.

Such mechanical oscillatory gears are known in various embodiments, for transferring the rotating drive motion of a motor shaft into the rotatingly oscillatingly movement of the tool spindle.

Due to the constantly increasing demands for the performance of oscillatory tools herein high demands are present with respect to the mechanical oscillatory gears. These are subject to a high mechanical load due to the oscillatory load and therefore may be subject to wear in long-time operation. In case of high load also the noise generation increases. Finally the oscillatory gears lead to more or less vibrations depending on the load which partially is sensed disadvantageously by the user.

SUMMARY OF THE INVENTION

In view of this it is one object of the invention to disclose an oscillatingly driven machine tool that allows for a high mechanical load.

It is a further object of the invention to disclose an oscillatingly driven machine tool that is simple and reliable in the long-run.

It is another object of the invention to disclose an oscillatingly driven machine tool having little wear.

It is another object of the invention to disclose an oscillatingly driven machine tool having little vibrations.

According to one aspect of the invention an oscillatingly driven machine tool is disclosed comprising a tool spindle mounted pivotably about its longitudinal axis, further comprising a drive motor being coupled with a hydraulic generator for generating an oscillating fluid flow for driving a hydraulic motor configured as a rotor blade motor for rotatingly oscillating driving said tool spindle about a longitudinal axis thereof.

The object of the invention is solved in this way.

By using a hydraulic device for the rotary oscillatory drive of the tool spindle higher drive powers than with mechanical oscillatory gears are made possible, wherein partially simultaneously the wear can be reduced and the smooth running can be improved. The rotor blade motor makes possible a direct conversion of the pulsating fluid energy into an oscillatory motion of the tool spindle without requiring a mechanical gear to this end.

A particular advantage of the above design rests in the fact that by a suitable dimensioning of the hydraulic device the essential parameters of the oscillatory drive can be adjusted, namely in particular the oscillation angle, the angular velocity, the angular acceleration and the generated rotary moment. In particular high rotary moments can be generated with relative little wear and vibrations.

According to another aspect of the invention the rotor blade motor comprises symmetrically arranged rotor blades arranged in defined angular distances with respect to each other.

In this way one-sided bearing loads (in lateral direction) are avoided. An overall more even bearing load and thereby a reduced wear are obtained.

According to another aspect of the invention the rotor blades are configured as rotor blade fingers on the tool spindle.

In this way a particularly simple design is obtained.

According to another aspect of the invention the tool spindle runs within a bushing configured suitably as a counterpart.

In this way a low-wear connection can be obtained.

Preferably on both sides of the rotor blade fingers fluid chambers are formed together with the bushing that are coupled with connections of the hydraulic generator pressure-pulsating oppositely.

By these measures a simple design and a simple sealing of the fluid chambers are obtained.

According to another aspect of the invention the bushing is made of a bronze alloy, and the tool spindle preferably is made of steel.

By such a material pairing the sliding friction is minimized, a reduced wear and a permanently low inner leakage at the rotor blade fingers are obtained.

According to another aspect of the invention the rotor blade motor comprises four rotor blade fingers which are offset angularly each by 90° with respect to each other.

Thereby a good compromise between a small installation space and a low idle pressure of the hydraulic system is reached.

According to another aspect of the invention the hydraulic generator is configured as a displacement pump comprising a linear piston which is driven by the motor shaft of the drive motor by means of an eccentric.

Thereby a particularly simple and reliable design of the hydraulic generator is reached.

According to another aspect of the invention on both ends of the linear piston pressure chambers are formed, wherein the oppositely pulsating fluid energy is generated.

Herein preferably each of the two pressure chambers is coupled via a manifold to assigned bores at the bushing for supplying the fluid chambers on both sides of the rotor blade fingers with oppositely pulsating fluid.

In this way a simple and reliable design is reached.

According to another aspect of the invention a hydraulic fluid reservoir subjected to pressure is provided, which is coupled to the hydraulic generator by means of check valves.

Herein the hydraulic fluid reservoir may for instance be configured as a chamber of a cylinder. The respective pressure supply is generated by a spring acting onto the piston being displaceable within the cylinder.

In this way a compensation for leakage losses is ensured.

It will be understood that the afore-mentioned features of the invention and the features to be explained hereinafter cannot only be used in the given combination, but also in different combinations or independently, without leaving the scope of the present invention.

BRIEF DESCRIPTION OF THE DRAWINGS

Further features and advantages of the invention can be taken from the subsequent description of preferred embodiments with reference to the drawings. In the drawings show:

FIG. 2 is a principle representation of a rotor blade motor according to the invention which according to FIG. 1 is used for directly transforming oscillatory fluid energy into an oscillatory drive motion of the tool spindle;

FIG. 3 is a longitudinal section through the multiple chamber rotor piston according to FIG. 2;

FIG. 5 is a simplified section through the hydraulic generator according to FIG. 1.

DETAILED DESCRIPTION OF THE INVENTION

Figure 1:
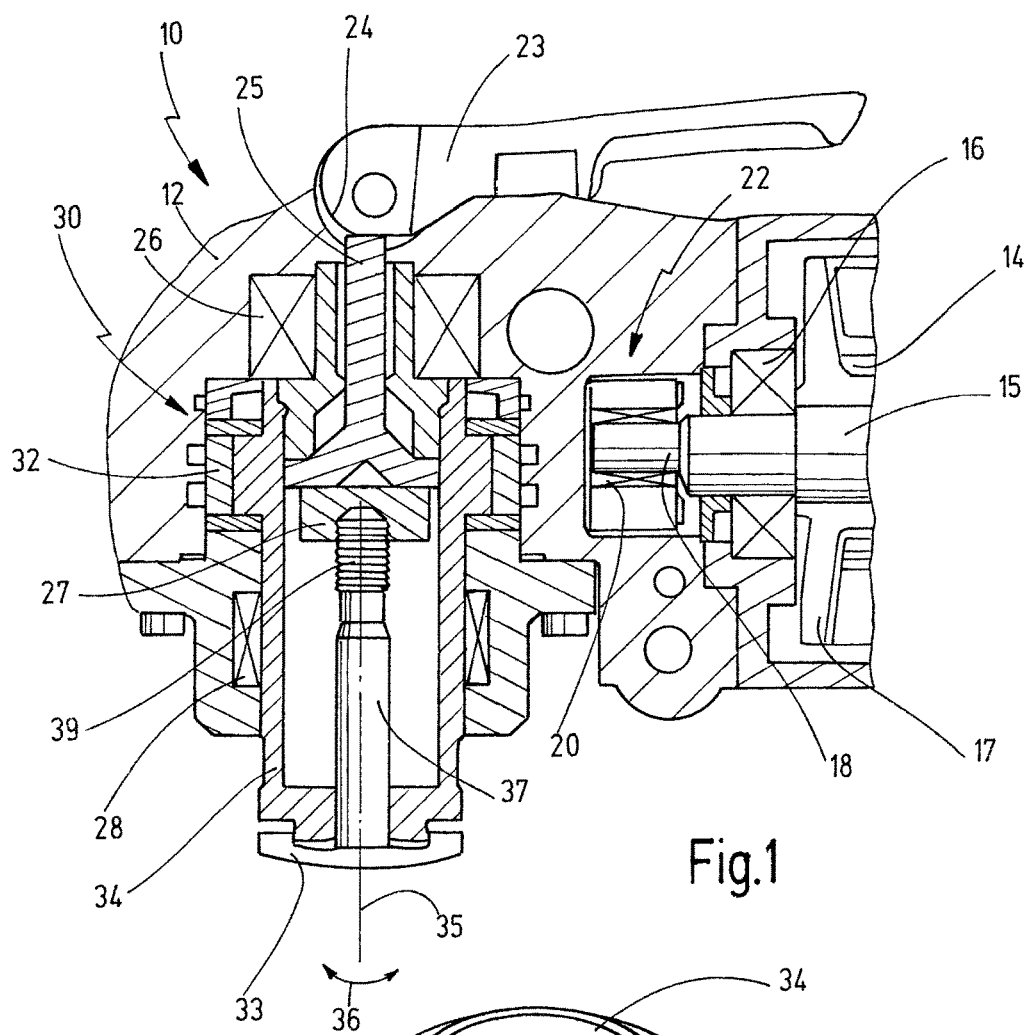
FIG. 1 is a partial section of an oscillatingly driven tool machine according to the invention.

In FIG. 1 an oscillatingly driven machine tool is shown and depicted in total with numeral 10.

The tool machine 10 comprises a tool spindle 34 which is mounted by means of two roller bearings 26, 28 pivotably about its longitudinal axis 35.

The tool spindle 34 is configured as a hollow spindle including a plunger 25 received therein and biased against the force of a spring (not shown) and a holding element 27 held thereon. The plunger 25 can be displaced by means of a clamping lever 23 via an eccentric 24 acting axially onto the plunger 25 against the bias of the spring, to which end the clamping lever 23 is pivoted from the clamping position shown in FIG. 1 to the front into a release position. Thereby a clamping element 37 held within the holding element 27 and engaging by means of a toothing 39 into the holding element 27 is released so that the clamping element 37 can be removed to allow a removal of a tool held between the outer front face of the tool spindle 34 and a head 33 of the clamping element 37.

For clamping, the clamping element 37 again is introduced through an assigned opening of the tool into the tool spindle 34, until the toothing 39 engages the holding element 37, and the clamping lever 23 is again moved into the clamping position according to FIG. 1.

The tool spindle 34 can be driven about its longitudinal axis 35 at high frequency and in the range of about 5,000 to 30,000 oscillations per minute and at a pivot angle in the range of about ±1° to ±5° (from reversal point to reversal point). Preferably the frequency corresponds to the rotational speed of the drive motor 14 that is used and is about 20,000 oscillations per minute or about 333 Hz. The pivot angle from reversal point to reversal point preferably is about ±2.5°.

For transferring a high power onto the tool spindle 34 now a hydraulic gear is used by contrast to the mechanical coupling by means of an oscillatory gear as known in the prior art.

To this end a hydraulic generator is driven by motor 14 which in FIG. 1 is simply depicted with numeral 22. The oscillating fluid energy from the hydraulic generator 22 is transferred by means of a hydraulic motor 30 being coupled with the tool spindle 34 into a rotary oscillatory drive motion of the tool spindle 34 about the longitudinal axis 35 thereof.

In FIG. 2 the hydraulic motor 30 according to FIG. 1 is shown schematically. It is configured as a symmetrically designed rotor blade/pivot blade motor (in short rotor blade motor) 30 comprising four rotor blades 38 which are each angularly offset by 90° with respect to each other and which are formed on the outer side of the tool spindle 34. To each rotor blade finger 38 two adjacent fluid chambers 40, 41 are assigned which are formed between the tool spindle 34 and the surrounding bushing 32 within which the tool spindle 34 runs in this region.

Thus on both sides of each rotor blade finger 38 adjacent fluid chambers 40, 41 are formed. Thus in total along the circumference of the tool spindle 34 eight fluid chambers 40, 41 are formed in defined angular distances to each other. From these the fluid chambers 40 on the one rotary side are coupled with each other by means of an assigned manifold 43 and are connected to the hydraulic generator 22. The other fluid chambers 41 on the other rotary side are coupled with each other by means of an assigned manifold 42 and are connected to the other output of the hydraulic generator 22. By means of the hydraulic generator 22 a pulsating fluid pressure is generated, whereby the pressure pulses alternatingly between the two outputs to which the manifolds 42 and 43, respectively, are connected. Thus alternatingly an excess pressure results in the fluid chambers 40 and in den fluid chambers 41. In this way the pulsating hydraulic energy is directly transformed into an oscillatory rotary motion of the tool spindle 34.

The hydraulic generator 22 used to this end can be seen in more detail from FIG. 5.

The motor shaft 15 of the drive motor 14 is mounted as its end at which the blower 17 is held as mounted on the housing 12 by means of a roller bearing 16. At the end of the motor shaft 15 an eccentric 18 is supported whereon an eccentric bearing 20 is provided. The eccentric bearing 20 engages into a linear piston 46 so that the latter is moved oscillatingly back and forth in longitudinal direction upon rotation of the motor shaft 15, as shown by the double arrow 48. The linear piston 46 at each of its two ends, respectively, acts together with a fluid chamber 50 and 52, respectively, so that the hydraulic fluid present within the fluid chambers 50 and 52, respectively is alternatingly compressed by the movement of the linear piston 46 within one pressure room pressure chamber 50 and the other pressure chamber 52.

The pulsating hydraulic energy thus generated is coupled directly via the manifolds 42, 43 into the assigned fluid chambers 40 and 41, respectively of the hydraulic motor 30, so that the rotary oscillatory drive motion of the tool spindle 34 results.

According to FIG. 5 the linear piston 46 is connected centrally with the eccentric bearing 20 so as to avoid an unsymmetric bearing load. To this end the eccentric bearing 20 is configured as a parted bearing consisting of two individual bearings which engage on the linear piston 46 symmetrically.

Figure 4:
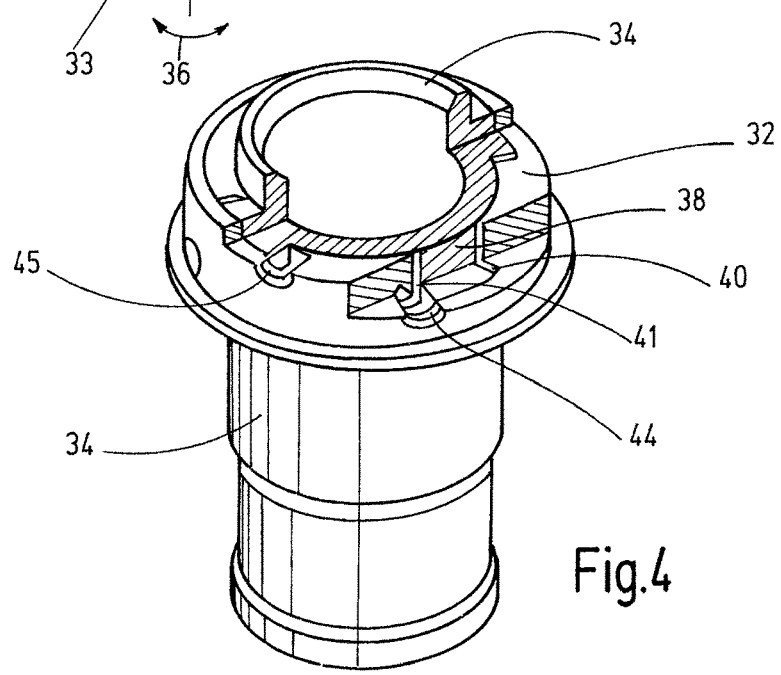
FIG. 4 is a perspective view of the multiple chamber rotor pistons according to FIG. 3.

From FIG. 4 it can be seen how the fluid chambers 40, 41 that are formed between the tool spindle 34 and the bushing 32 can be coupled from the outside with the two hydraulic lines via bores 44, 45 within the bushing 32. The hydraulic lines (not shown) can be screw-connected with the bores 44, 45. In a preferred embodiment the hydraulic lines are incorporated into the upper housing 12 and each contact directly the respectively assigned bores 44 and 45, respectively.

While the tool spindle 34 preferably consists of steel, the bushing 32 preferably consists of a bronze alloy.

In this way a particularly low sliding friction and thus a wear minimization results.

From FIG. 3 it can be seen that a disk-shaped sealing ring 31 is arranged on both sides of the bushing 32 at the tool spindle 34.

Figure 6:
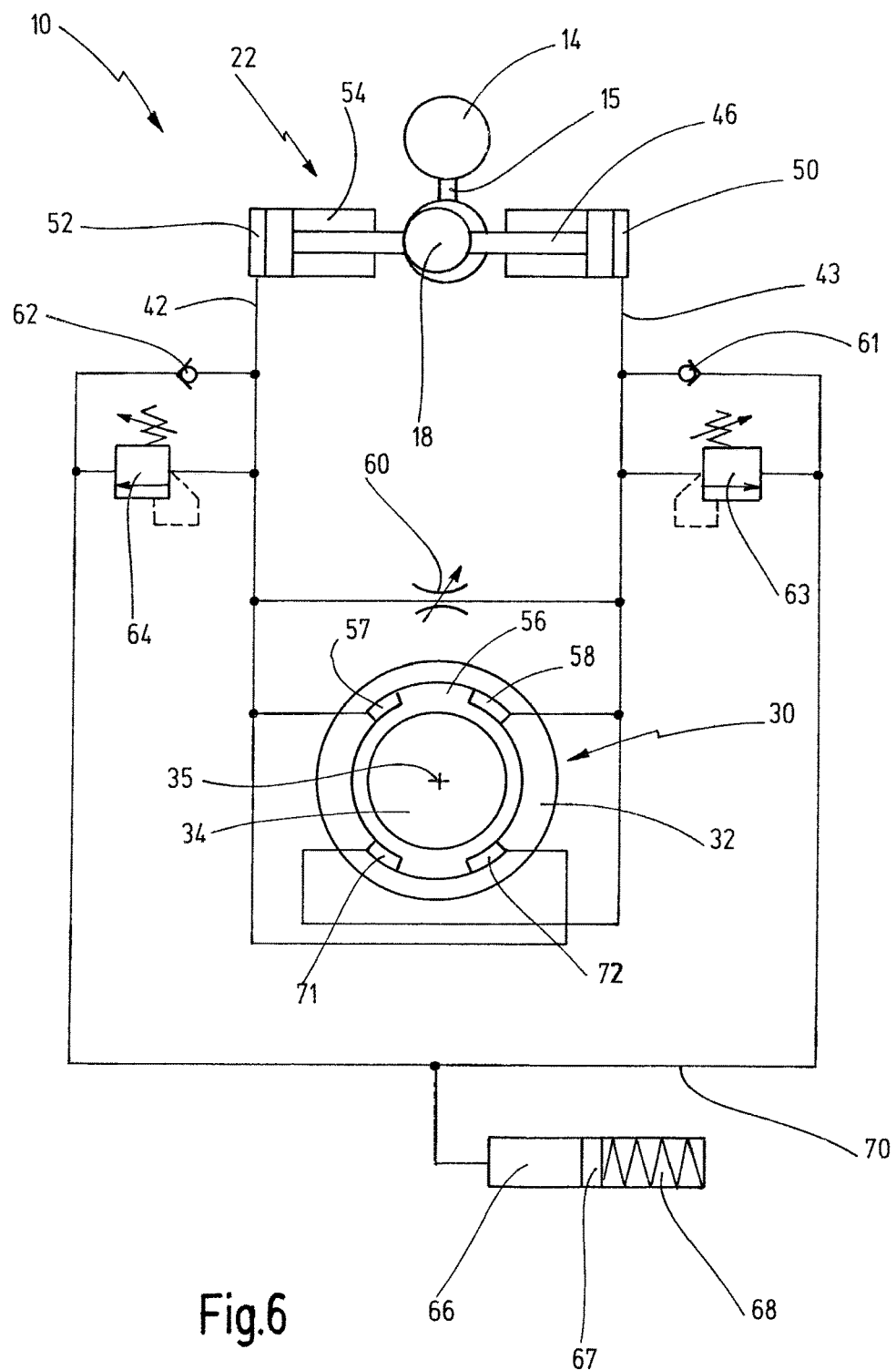
FIG. 6 is a principle representation of the total hydraulic system of the machine tool according to FIG. 1.

The hydraulic schema of the tool machine 10 according to FIG. 1 is shown schematically in FIG. 6.

In the upper half of FIG. 6 the hydraulic generator 22 is depicted which is driven by means of the drive motor 14 via the motor shaft 15 and the eccentric 18 driven thereby. The eccentric 18 moves the linear piston 46 within a fluid cylinder 54. Thus, in the pressure chambers 50, 52 at both ends of the linear piston 46 respective pressure pulsations with opposite signs result. The two pressure chambers 50, 52 of the hydraulic generator 22 are connected with the rotor blade motor 30 by means of fluid lines 42, 43. The rotor blade motor 30 in the configuration shown here comprises two rotor blade fingers 56 opposite each other which are formed directly on the tool spindle 34. The counterpart to the rotor blade fingers 56 at the tool spindle 34 is formed by a suitably shaped bushing 32 which preferably consists of bronze.

On both sides of each rotor blade finger 56 between the tool spindle 34 and the bushing 32 a respective fluid chamber 57, 58 or 71, 72, respectively, is formed. Fluid chambers 57, 72 and 56, 71, respectively arranged opposite each other and acting in the same rotary direction are each commonly coupled with the respective fluid line 42 and 43, respectively.

In this way the alternating pressure pulsations within the lines 42, 43 result in a rotary pivot motion of the tool spindle 34 about its longitudinal axis 35. In FIG. 6 exemplarily only two rotor blade fingers 56 are indicated which are arranged opposite each other. It will be understood that preferably a higher number of rotor blade fingers can be used so that it is configured as a multiple-chamber rotor blade motor as explained above with reference to FIG. 2.

To avoid an excess pressure, both fluid lines 42, 43 may be connected with an overpressure valve 64 or 63, respectively. The overpressure valves 63, 64 are merely optional. If they are dispensed with, then this can be reached by a sufficient dimensioning. At the limit the drive motor 14 runs slowlier and thus avoids a further pressure rise. An omission of the overpressure valves 63, 64 counteracts a drifting of the tool spindle 34 from the center position.

In addition to both lines 42, 43 a pressurized fluid reservoir 66, 67 is connected via assigned check valves 62 and 61, respectively, using a common line 70.

Fluid losses that are unavoidable in practical operation can be compensated in this way. A suitable amount of hydraulic fluid is received to this end in a fluid cylinder 66. The latter is biased by means of a piston 67 which is pressurized by a suitably dimensioned spring 68.

Thus within the line 70 a specific fluid pressure is set which may for instance be in the range of 2.9 to 5.2 bars. If the pressure in one of the two lines 42, 43 falls below this value, then hydraulic fluid from the fluid cylinder 66 is conveyed. To this end the check valves preferably have an opening pressure of 0.2 bars.

Between the two lines 42, 43 which are connected to the pressure chambers 50, 52 of the fluid cylinder 54, in addition, a bypass throttle 60 is arranged.

By means of the bypass throttle 60 the amplitude of the oscillatory motion of the tool spindle 34 can be adjusted continuously, and the tool spindle can be manually adjusted into the central position when the bypass throttle 60 is open.

What is claimed is:

1. An oscillatingly driven tool machine comprising:
   a tool spindle mounted pivotably about a longitudinal axis thereof;
   a drive motor driving a hydraulic generator for generating a pulsating fluid flow output at least at two output connections carrying pulsating fluid flows of alternating pressures;
   an oscillating hydraulic rotor blade motor comprising said tool spindle as a rotor;
   a plurality of rotor blades arranged on said tool spindle and forming fluid compartments together with a surrounding bushing, within which said tool spindle is supported rotatably;
   wherein at least one of said fluid compartments is connected with a first one of said output connections and at least another one is connected with a second one of said output connections, thereby moving said tool spindle oscillatingly back and forth about said longitudinal axis.

2. The tool machine of claim 1, wherein said rotor blades are arranged symmetrically on said tool spindle.

3. The tool machine of claim 1, wherein said rotor blade motor comprises four symmetrically arranged rotor blades.

4. The tool machine of claim 1, wherein said rotor blades are configured as rotor blade fingers being arranged on said tool spindle.

5. The tool machine of claim 4, further comprising a first manifold for connecting said pressure chambers on a first side of said rotor blade fingers with a first one of said output connections, and further comprising a second manifold for connecting said pressure chambers on a second side of said rotor blade fingers with a second one of said output connections.

6. The tool machine of claim 5, wherein said pressure chambers comprise bores on said first side of said rotor blade fingers being connected with said first manifold, and further comprise bores on said second side of said rotor blade fingers being connected with said second manifold.

7. The tool machine of claim 1, wherein on both sides of each rotor blade finger fluid chambers are formed with said bushing, said fluid chambers on a first side of said rotor blade fingers being coupled with a first one of said output connections of said hydraulic generator, and said fluid chambers on a second side of said rotor blade fingers being coupled with a second one of said output connections of said hydraulic generator.

8. The tool machine of claim 1, wherein said bushing consists of a bronze alloy, and said tool spindle consists of steel.

9. The tool machine of claim 1, wherein said rotor blade motor comprises four rotor blade fingers which are angularly offset with respect to each other by 90°.

10. The tool machine of claim 1, wherein said hydraulic generator is configured as a displacement pump comprising a linear piston being driven by a motor shaft of said drive motor via an eccentric.

11. The tool machine of claim 10, wherein at both ends of said linear piston pressure chambers are formed, oppositely pulsating fluid energy being generated therein.

12. The tool machine of claim 1, further comprising a pressurized hydraulic fluid reservoir being coupled to said hydraulic generator by means of check valves for compensating leakage losses.

13. The tool machine of claim 1, wherein said hydraulic fluid reservoir comprises a cylinder within which a piston is displaceable that is biased by means of a spring element.

14. An oscillatingly driven tool machine comprising
a tool spindle mounted pivotably about a longitudinal axis thereof;
a drive motor being coupled with a hydraulic generator for generating an oscillating fluid flow;
a hydraulic motor configured as a rotor blade motor comprising a plurality of symmetrically arranged fluid compartments being driven by said oscillating fluid flow, said hydraulic motor driving said tool spindle rotatingly oscillatingly about a longitudinal axis thereof.

15. The tool machine of claim 14, wherein said rotor blade motor comprises at least four symmetrically arranged rotor blades.

16. The tool machine of claim 14, wherein said rotor blades are configured as rotor blade fingers being arranged on said tool spindle.

17. The tool machine of claim 14, wherein said rotor blade motor comprises four rotor blade fingers which are angularly offset with respect to each other by 90°.

18. The tool machine of claim 14, wherein said hydraulic generator is configured as a displacement pump comprising a linear piston being driven by a motor shaft of said drive motor via an eccentric.

19. An oscillatingly driven tool machine comprising a tool spindle mounted pivotably about its longitudinal axis, further comprising a drive motor being coupled with a hydraulic generator for generating an oscillating fluid flow for driving a hydraulic motor configured as a rotor blade motor for rotatingly oscillating driving said tool spindle about a longitudinal axis thereof.

20. The tool machine tool of claim 19, wherein said tool spindle runs within a bushing shaped as a counterpart.

* * * * *